United States Patent
Meltser et al.

(10) Patent No.: US 9,174,655 B2
(45) Date of Patent: Nov. 3, 2015

(54) SYSTEM AND METHOD FOR VEHICLE ENGINE CONTROL

(71) Applicant: General Electric Company, Schenectady, NY (US)

(72) Inventors: Mikhail Meltser, Buffalo Grove, IL (US); Sandeep Banga, Erie, PA (US); Timothy John Medema, Arlington Heights, IL (US)

(73) Assignee: General Electric Company, Schenectady, NY (US)

( * ) Notice: Subject to any disclaimer, the term of this patent is extended or adjusted under 35 U.S.C. 154(b) by 34 days.

(21) Appl. No.: 14/164,391

(22) Filed: Jan. 27, 2014

(65) Prior Publication Data

US 2015/0210295 A1  Jul. 30, 2015

(51) Int. Cl.
*B61C 17/12* (2006.01)
*G06F 7/00* (2006.01)

(52) U.S. Cl.
CPC .. *B61C 17/12* (2013.01); *G06F 7/00* (2013.01)

(58) Field of Classification Search
CPC ..... B60T 13/665; B60T 17/228; B60T 15/02; B60L 2200/26; B61L 15/0036; B61L 3/006
USPC ................ 701/19, 20; 105/26.05; 246/187 C, 246/182 B; 303/20, 3
See application file for complete search history.

(56) References Cited

U.S. PATENT DOCUMENTS

| | | | |
|---|---|---|---|
| 4,344,364 A * | 8/1982 | Nickles et al. | 105/62.1 |
| 7,302,895 B2 | 12/2007 | Kumar et al. | |
| 8,346,414 B2 | 1/2013 | Liberatore | |
| 8,538,610 B2 | 9/2013 | Liberatore | |
| 2010/0256842 A1 * | 10/2010 | Liberatore | 701/19 |
| 2011/0060486 A1 | 3/2011 | Meltser et al. | |
| 2012/0089537 A1 | 4/2012 | Cooper et al. | |
| 2012/0143407 A1 | 6/2012 | Murthy | |

* cited by examiner

*Primary Examiner* — Marthe Marc-Coleman
(74) *Attorney, Agent, or Firm* — GE Global Patent Operation; John A. Kramer (57) ABSTRACT

A control system for a vehicle system includes a mechanically-adjustable valve having a plurality of positions, a position sensor, and a controller. The mechanically-adjustable valve is configured to be disposed onboard a rail vehicle that is coupled to at least one other rail vehicle in a consist. The position sensor is configured to be disposed in the rail vehicle to monitor a current position of the mechanically-adjustable valve. The position sensor is configured to generate an output signal that represents the current position of the mechanically-adjustable valve. The controller is configured to be communicatively coupled to the position sensor and to receive the output signal of the position sensor. The controller is configured to set an operational status of the rail vehicle in the consist based on the output signal and to adjust automatic engine shutdown and restart operations of the rail vehicle based on the operational status.

21 Claims, 4 Drawing Sheets

SYSTEM AND METHOD FOR VEHICLE ENGINE CONTROL

TECHNICAL FIELD

Embodiments of the subject matter disclosed herein relate to controlling vehicle engine systems.

BACKGROUND

A train consist can include one or more locomotives (or other powered rail vehicles) and one or more cars. A consist may include a lead locomotive and one or more trail locomotives. The locomotives may be operated with idle reduction strategies, such as using automatic engine shutdown and restart operations, sometimes referred to as automatic engine start/stop (AESS) operations. The AESS operations are designed to reduce the amount of time a locomotive engine is kept idling by shutting down the engine when parameters indicate that stopping the engine is safe and restarting the engine when the parameters indicate otherwise. Reducing the amount of time a locomotive engine is kept idling cuts emissions, reduces noise, and saves fuel to increase the efficiency of the vehicle system.

Newer locomotives may include integrated electronic air brake systems in communication with an integrated function computer (IFC). The integrated electronic braking system is capable of determining and relaying an operational status of the locomotive (e.g., status for distributed power operations, and/or positional status), as set by an operator through the IFC, to a locomotive controller. The locomotive controller adjusts locomotive engine operations, such as locomotive AESS operations, based on the relayed operational status of the locomotive. Older locomotives lacking such integrated electronic braking systems, however, are unable to determine and relay the operational status of a locomotive automatically to a locomotive controller. Consequently, the increased efficiency and other benefits of AESS operations that are based on the operational status of the locomotive may not be available to older locomotives that lack integrated electronic air brake systems.

BRIEF DESCRIPTION

In an embodiment, a control system for a vehicle system includes a mechanically-adjustable valve, a position sensor, and a controller. The mechanically-adjustable valve is configured to be disposed onboard a rail vehicle that is coupled to at least one other rail vehicle in a consist to travel together along a route for a trip. The mechanically-adjustable valve has a plurality of positions. The position sensor is configured to be disposed in the rail vehicle to monitor a current position of the mechanically-adjustable valve. The position sensor is configured to generate an output signal that represents the current position of the mechanically-adjustable valve. The controller is configured to be communicatively coupled to the position sensor and to receive the output signal of the position sensor. The controller is also configured to set an operational status of the rail vehicle in the consist based on the output signal and to adjust automatic engine shutdown and restart operations of the rail vehicle based on the operational status of the rail vehicle.

In an embodiment, a method (e.g., for setting an operational status of a rail vehicle in a consist and adjusting engine operations of the rail vehicle) includes receiving an output signal from a position sensor configured to be disposed onboard a rail vehicle that is coupled to at least one other rail vehicle in a consist to travel together along a route for a trip. The position sensor is configured to monitor a current position of a mechanically-adjustable valve configured to be disposed onboard the rail vehicle. The mechanically-adjustable valve has a plurality of positions. The position sensor is configured to generate an output signal that represents the current position of the mechanically-adjustable valve. The method also includes setting, by one or more processors, an operational status of the rail vehicle in the consist to one of a lead status or a trail status automatically based on the output signal received from the position sensor. The lead status represents that operational settings including at least one of throttle or brake settings of the rail vehicle during the trip are used to control the at least one other rail vehicle in the consist according to a distributed power arrangement. The trail status represents that the operational settings of the rail vehicle are controlled by the at least one other rail vehicle in the consist. The method further includes adjusting, by the one or more processors, automatic engine shutdown and restart operations of the rail vehicle based on the operational status.

In an embodiment, a control system for a vehicle system includes a mechanically-adjustable first control switch configured to be disposed onboard a rail vehicle that is coupled to at least one other rail vehicle in a consist to travel together along a route for a trip. The first control switch has a plurality of positions and generates a first signal that represents a current position of the first control switch among the plurality of positions. The controller is configured to be communicatively coupled to the first control switch to receive the first signal generated by the first control switch. The controller is configured to set an operational status of the rail vehicle in the consist based on the signal and to adjust automatic engine shutdown and restart operations of the rail vehicle based on the operational status of the rail vehicle. The operational status is at least one of lead run, lead isolate, trail run, or trail isolate.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

The foregoing summary, as well as the following detailed description of certain embodiments of the inventive subject matter, will be better understood when read in conjunction with the appended drawings. To the extent that the figures illustrate diagrams of the functional blocks of various embodiments, the functional blocks are not necessarily indicative of the division between hardware and/or circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be standalone programs, may be incorporated as subroutines in an operating system, may be functions in an installed software package, and the like. The various embodiments are not limited to the arrangements and instrumentality shown in the drawings.

The systems described herein can include or represent hardware and associated instructions (e.g., software stored on a tangible and non-transitory computer readable storage medium, such as a computer hard drive, ROM, RAM, or the like) that perform the operations described herein. The hardware may include electronic circuits that include and/or are connected to one or more logic-based devices, such as microprocessors, processors, controllers, or the like. These devices may be off-the-shelf devices that perform the operations described herein from the instructions described above. Additionally or alternatively, one or more of these devices may be hard-wired with logic circuits to perform these operations. "Controller," "unit," and/or "module," as used herein, may refer to the logic circuitry and/or processing elements and associated software or program involved in controlling an energy storage system.

Figure 1:
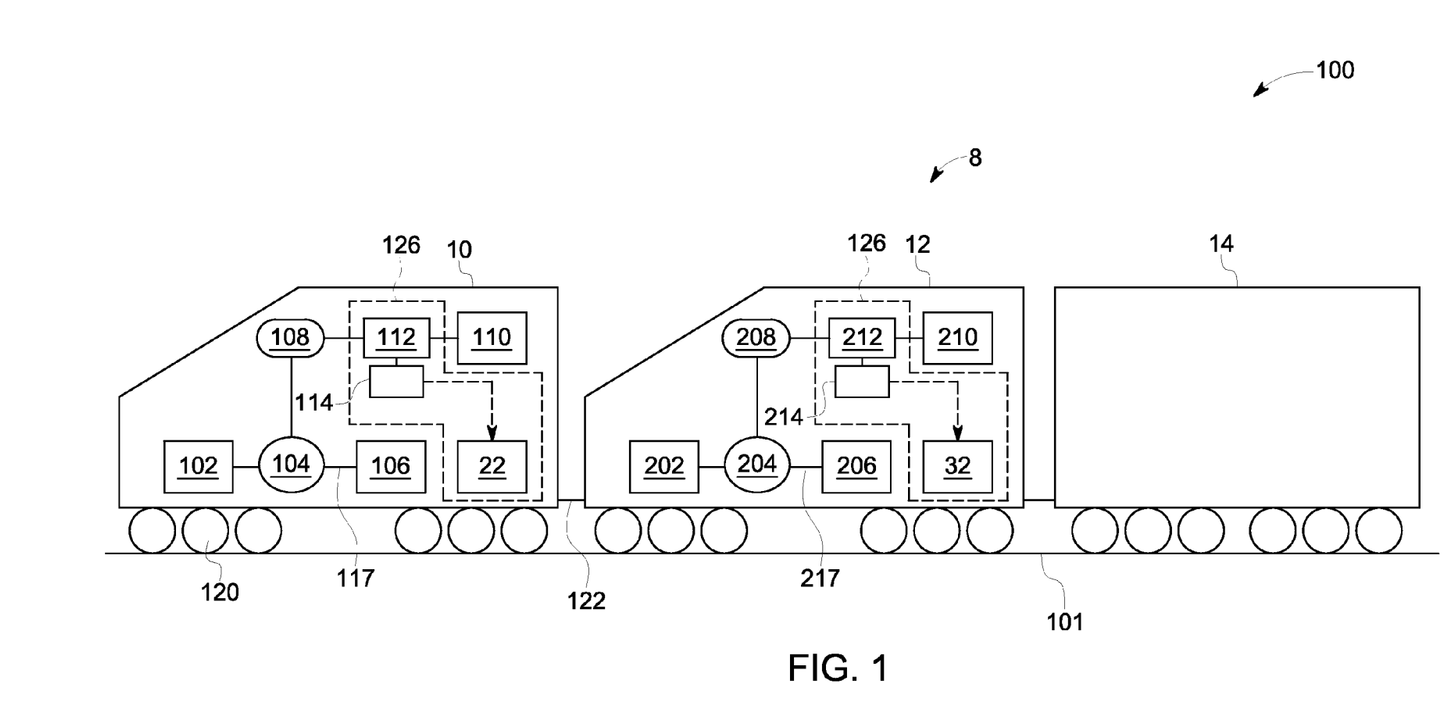
FIG. 1 illustrates a rail vehicle system according to an example embodiment.

FIG. 1 is a schematic diagram of an example embodiment of a rail vehicle system 100 configured to travel on a track 101 for a trip. The track 101 may be a segment of a larger vehicle network that includes one or more routes. The rail vehicle system 100 includes a plurality of rail vehicles, such as a first rail vehicle 10, a second rail vehicle 12, and a third rail vehicle 14. The first and second rail vehicles 10, 12 may be locomotives or other propulsion-generating vehicles that generate tractive effort to propel the rail vehicle system 100 along the track 101. For example, the rail vehicles 10, 12 may each include an electric engine 102, 202, respectively, that generates a torque output that is used by one or more traction motors (not shown) to provide tractive power to propel the rail vehicle system 100. The third rail vehicle 14 may be a non-propulsion-generating vehicle, such as a passenger or freight car, that is pulled and/or pushed along the track 101 by the propulsion-generating vehicles 10, 12. The rail vehicle 14 does not provide tractive effort, but may include a brake system configured to provide braking effort to slow movement of the rail vehicle system 100 when controlled to apply the brakes. Although only three rail vehicles are depicted in FIG. 1, the rail vehicle system 100 may have more vehicles, such as additional propulsion-generating and non-propulsion-generating vehicles. Some propulsion-generating vehicles in the rail vehicle system 100 may be separated by at least one non-propulsion-generating vehicle.

The first and second rail vehicles 10, 12 may form at least part of a consist 8. As used herein, the term "consist" may refer to a group of one or more vehicles that are mechanically and/or logically linked together to travel along a route for a trip. For example, the consist 8 may include two or more rail vehicles (e.g., rail vehicles 10, 12) that are mechanically coupled with each other and/or that communicate with each other over one or more wired and/or wireless connections to coordinate control of tractive efforts and/or braking efforts of the vehicles in the consist 8.

In an embodiment, the rail vehicles 10, 12 in the consist 8 may be operated according to a distributed power arrangement. For example, the first rail vehicle 10 may have a lead operational status and the second rail vehicle 12 may have a trail operational status. Alternatively, the first rail vehicle 10 has a trail operational status, while the second vehicle 12 has a lead operational status. The lead operational status represents that operational settings including at least one of throttle or brake settings of the vehicle during the trip are used to control the vehicle or vehicles having the trail operational status. The trail operational status represents that operational settings including at least one of throttle or brake settings of the vehicle are being controlled by the rail vehicle in the consist with the lead operational status. For example, when the operational status of the rail vehicle is set to the lead status, the rail vehicle is configured to control the at least one other rail vehicle in the consist during some or all of the trip (that is, until the operational status is changed), according to the distributed power arrangement, based on the operational settings of the rail vehicle (e.g., the throttle and/or brake settings of the rail vehicle). Thus, it may be the case that the when the rail vehicle is controlled to a particular throttle level, the at least one other rail vehicle is controlled to the same throttle level. As another example, when the operational status of the rail vehicle is set to the trail status, the rail vehicle is configured for its operational settings (e.g., throttle and/or brake settings) to be controlled by the at least one other rail vehicle in the consist.

The terms "lead" and "trail" refer to control operations and not to physical position within the rail vehicle system 100. For example, the second rail vehicle 12 may be a lead vehicle and the first rail vehicle 10 may be a trail vehicle although the second vehicle 12 is positioned behind the first vehicle 10 within the rail vehicle system 100. The operational status of each vehicle 10, 12 may be changed prior to or during movement of the vehicle system 100 along the track 101. For example, the operational status of the first rail vehicle 10 may change from lead to trail prior to or during a trip. In addition to the rail vehicles 10, 12 shown in FIG. 1, other rail vehicles coupled within same consist 8 as the rail vehicles 10, 12 or within different consists of the rail vehicle system 100 may be operated according to the distributed power arrangement. For example, both rail vehicles 10, 12 may be trail vehicles and the lead vehicle may be a rail vehicle in a different consist spaced apart from the consist 8, such that the operational settings of the rail vehicles 10, 12 are both controlled by the lead vehicle on the different consist.

The first and second rail vehicles 10, 12 may each include an onboard controller 22, 32, respectively, for control and management of various systems of the rail vehicles 10, 12. In one example, the onboard controllers 22, 32 include one or more processors including computer readable storage media that has non-transitory code with instructions for enabling monitoring of rail vehicle operations (e.g., on-board diagnostics). The onboard controllers 22, 32 are configured to receive signals from a variety of sensors, switches, and/or other devices in order to oversee and manage the various systems. The sensors may include, for example, coupler sensors, position sensors, track grade sensors, temperature sensors, pressure sensors, tractive effort sensors, and the like, coupled to the rail vehicles of the rail vehicle system 100. In addition, the controllers 22, 32 may receive signals from sensors and other devices located off-board the rail vehicle system 100, such as wayside devices and track sensors. The onboard controllers 22, 32 may also be linked to a display (not shown), such as a diagnostic interface display, to provide a user interface to the operator and/or operating crew.

In an embodiment, at least one of the controllers 22, 32 may form part of a control system 126 for controlling operations of the rail vehicle system 100. The control system 126 may include one or both of the controllers 22, 32 on the rail vehicles 10, 12 as well as a mechanically-adjustable valve and a corresponding position sensor that is configured to monitor a position of the mechanically-adjustable valve. The mechanically-adjustable valve may be a mechanically-adjustable valve 112 on the first rail vehicle 10 and/or a mechanically-adjustable valve 212 on the second rail vehicle 12. The associated position sensor may be a position sensor 114 on the first rail vehicle 10 that monitors the valve 112 and/or a position sensor 214 on the second rail vehicle 12 that monitors the valve 212. The mechanically-adjustable valves 112, 212 and associated position sensors 114, 214 are described in more detail herein. Alternatively, or in addition to a mechanically-adjustable valve and a position sensor, the control system 126 may include a mechanically-adjustable control switch, such as the engine control switch 400 shown in FIG. 4 or the engine control switch 500 shown in FIG. 5. Furthermore, the control system 126 may include various other sensors and/or devices that communicate with the controller (e.g., controller 22 and/or controller 32), as described above.

The control system 126 may be configured to adjust various operational settings and/or parameters for one or both rail vehicles 10, 12 either prior to or during movement of the rail vehicle system 100 along the track 101. The operational settings and/or parameters may include, for example, notch settings, engine injection timing, power distribution between rail vehicles, speed limits, automatic engine start/stop (AESS) operational settings, and the like. For example, based on the signals received from the various sensors and/or devices (e.g., the position sensors 114, 214 and/or the control switches 400, 500), the controller may set an operational status of at least one of the rail vehicles 10, 12 in the consist 8. In addition to adjusting AESS operational settings, the control system 126, via the controller, may control an AESS operation, thereby enabling the respective engine 102, 202 to be automatically stopped or started during AESS opportunities, such as when the rail vehicles 10, 12 are idling.

In some embodiments, the control system 126 may be in communication with a remote controller housed at a distant location, such as at a dispatch center. The control system 126 may communicate with the remote controller through wireless communication, for example. The control system 126 may relay information, such as details of AESS operations performed, to the remote controller for storage in a database and/or analysis. The remote controller may assist one or both of the onboard controllers 22, 32 of the control system 126 in determining operating parameters for the rail vehicle system 100 during a trip based on estimated and/or predicted operating conditions. Further, the remote controller may be configured to coordinate operation of the rail vehicle system 100 with other trains, rail vehicles, and/or locomotives in a vehicle network.

The engines 102, 202, located on the respective rail vehicles 10, 12, may generate a torque that is transmitted to an alternator (not shown) along a drive shaft. The generated torque is used by the alternator to generate electricity for subsequent propagation and use by various systems in the rail vehicle 100. The engines 102, 202 may be run at a constant speed, thereby generating a constant horsepower output, or at variable speed generating variable horsepower output, based on operational demand. The electrical power may be transmitted along an electrical bus 117, 217 in each respective rail vehicle 10, 12 to a variety of downstream electrical components. Based on the nature of the generated electrical output, the electrical bus 117, 217 may be a direct current (DC) bus or an alternating current (AC) bus. In an embodiment, the bus 117, 217 on each vehicle 10, 12 is a DC bus. The alternator may be connected to one or more rectifiers that convert the alternator's electrical output to DC electrical power prior to transmission along the bus 117, 217. Based on the configuration of a downstream electrical component receiving power from bus 117 or bus 217, one or more inverters may be configured to invert the electrical power from the electrical bus 117 or bus 217 prior to supplying the electrical power to the downstream component.

Traction motors (not shown) mounted on a truck below the rail vehicles 10, 12 receive current (e.g., from the engines 102, 202, respectively) and provide tractive power for propulsion. In one example, six inverter-traction motor pairs may be provided for each of six axle-wheel pairs 120 of each rail vehicle 10, 12. The traction motors are also configured to act as generators, providing dynamic braking to slow and potentially stop the rail vehicles 10, 12. In particular, during dynamic braking, each traction motor provides torque in a direction that is opposite from the torque required to propel the rail vehicle 10, 12 in a rolling direction, which generates electricity. For temperature control of the rail vehicle components, a multitude of airflow devices may be operated, including, but not limited to, blowers, radiators, and fans. For example, traction motor fans may be provided for cooling the traction motors that powering the wheels 120.

At least a portion of the electrical power generated by each engine 102, 202 may be routed via each bus 117, 217 to an electrical energy storage device, such as a battery 106, 206, located onboard the first and second rail vehicles 10, 12, respectively. A DC-DC converter (not shown) may be configured between the bus 117, 217 and battery 106, 206 on each vehicle 10, 12 to allow the high DC voltage of the bus (e.g., in the range of 1 kV) to be stepped down appropriately for use by the battery (e.g., in the range of 12-75 V). In the case of a hybrid rail vehicle, the on-board electrical energy storage device may be in the form of high voltage batteries, such that an intermediate DC-DC converter may not be necessary. The batteries 106, 206 may be charged by running the engines 102, 202, respectively. The electrical energy stored in each battery 106, 206 may be used when the engine is shut down to operate various electronic components, such as lights, on-board monitoring systems, microprocessors, processor displays, climate controls, and the like. The batteries 106, 206 may also be used to provide an initial charge to restart the respective engines 102, 202 from a shut-down condition.

Each rail vehicle 10, 12 further includes a pressure-actuated brake system 110, 210, respectively. The brake systems 110, 210 may be connected via a brake line 122 that extends between the vehicles 10, 12, such that the vehicles 10, 12 apply the brakes at the same time. The brake line 122 may also extend to the third vehicle 14 and/or other vehicles in the rail vehicle system 100. In the illustrated embodiment, both rail vehicles 10, 12 may be older rail vehicles with non-integrated pressure-actuated air brake systems. A non-integrated air brake system is not able to automatically determine and relay an operational status of a rail vehicle (e.g., a lead or trail status for distributed power operations), as set by an operator, to the controller 22, 32 for the controller 22, 32, to adjust engine parameters (e.g., parameters for AESS operations) based on the relayed operational status. In alternate embodiments, one or more of the rail vehicles 10, 12 may be newer rail vehicles that include integrated electronic air brake systems that are able to adjust engine parameters automatically based on a relayed operational status of the rail vehicle 10, 12.

The brake systems 110, 210 may be coupled to respective pressure reservoirs 108, 208 on each rail vehicle 10, 12. The pressure reservoirs 108, 208 are refillable and store compressed air that is generated from intake air by respective compressors 104, 204. Alternatively, a single compressor may supply compressed air to both pressure reservoirs 108, 208. During a brake application, the compressed air in the pressure reservoirs 108, 208 is released into a brake cylinder which forces brake pads into contact with the wheels 120 of the rail vehicles 10, 12 or discs coupled to the wheels 120. A pressure sensor (not shown) may monitor the pressure of the pressure reservoirs 108, 208, and one or both of the controllers 22, 32 may control the supply of compressed air into the pressure reservoirs 108, 208 to refill the reservoirs when the pressure falls below a threshold pressure value, such as after a brake application.

The first rail vehicle 10 includes a first mechanically-adjustable valve 112, and the second rail vehicle 12 includes a second mechanically-adjustable valve 212. Each of the mechanically-adjustable valves 112, 212 may be coupled to the brake system 110, 210 and/or pressure reservoir 108, 208 of the respective rail vehicle 10, 12. The first and second mechanically-adjustable valves 112, 212 each have a plurality of positions, including at least a first position and a second position. The position of at least one of the mechanically-adjustable valve 112, 212 may be mechanically set, for example, by a vehicle operator rotating a valve knob of the respective valve 112, 212. The vehicle operator may set the positions of the respective valve 112, 212 based on the operational status of the rail vehicle 10, 12 in the consist 8, such as lead or trail. For example, the first position of the valves 112, 212 may correspond to the respective rail vehicle 10, 12 having a lead operational status, and the second position of the valves 112, 212 may correspond to a trail operational status of the vehicle 10, 12.

The mechanically-adjustable valves 112, 212 are monitored by respective position sensors 114, 214. For example, the position sensors 114, 214 may monitor the mechanically-adjustable valves 112, 212 by monitoring a position and/or location of the valve knob that is mechanically set by the vehicle operator.

Figure 2:
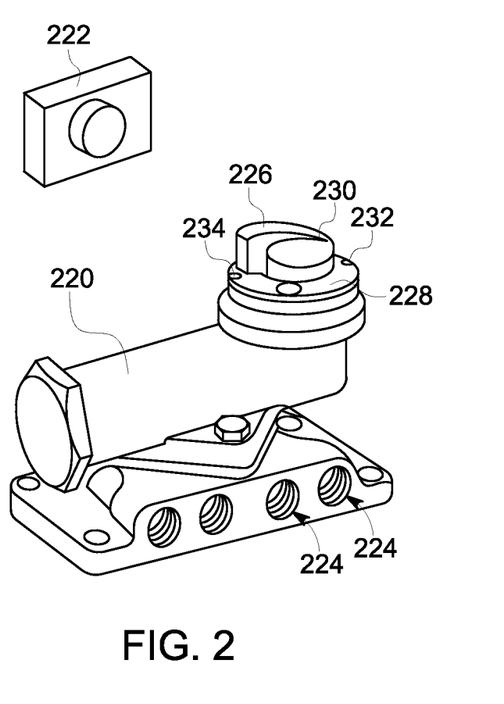
FIG. 2 is a mechanically-adjustable valve and a position sensor according to an example embodiment.

Reference is made now to FIG. 2 which shows an embodiment of a mechanically-adjustable valve 220 and an associated position sensor 222 onboard a rail vehicle. The mechanically-adjustable valve 220 may be one of the valves 112, 212 in the respective rail vehicles 10, 12 shown in FIG. 1. The position sensor 222 may be one of the position sensors 114, 214 in the respective rail vehicles 10, 12 shown in FIG. 1.

The mechanically-adjustable valve 220 may be a multi-unit pneumatic spool valve having a spool and a plurality of ports 224. Alternatively, the valve 220 may be a poppet valve or another type of valve. For example, the mechanically-adjustable valve 220 may be a MU-2-A control valve. The MU-2-A control valve is a manually-operated valve installed in the brake system of a rail vehicle and used in setting the operational status of the rail vehicle. The MU-2-A control valve may permit a rail vehicle to operate in multiple unit service with other rail vehicles equipped with compatible brake equipment. The MU-2-A control valve may be configured to control the flow of compressed air in the brake line between the pressure reservoir and other parts of the brake system.

At least one of the ports 224 of the valve 220 may be selectively and fluidly coupled to a pressure reservoir of the rail vehicle, such as one of the pressure reservoirs 108, 208. Based on the position of the mechanically-adjustable valve 220, the port 224 may be either fluidly coupled to or decoupled from the pressure reservoir. In addition, another port 224 of the valve 220 may be selectively and fluidly coupled to a brake system of the rail vehicle, such as one of the brake systems 110, 210. A pressure setting of the brake system may be based on the position of the mechanically-adjustable valve 220. For example, the pressure setting of the brake system may be at a higher setting when the valve 220 is in one position as opposed to when the valve 220 is in another position.

In alternative embodiments, the mechanically-adjustable valve 220 may be a pneumatic C-26 control valve or a double cut-out cock. The C-26 control valve is a manually-operated cut-out valve that is installed in the brake system and used in setting the operational status of the rail vehicle. The C-26 control valve may be configured to direct compressed air into and/or out from the brake cylinder pipe (e.g., brake line). The C-26 control valve may be configured to direct compressed air to an intermediate brake cylinder relay valve in response to changes in brake pipe pressure. A rail vehicle brake system may include both the MU-2-A valve and the C-26 valve. The double cut-out cock may be installed on a rail vehicle brake system as an alternative to the MU-2-A valve. The position sensor 222 may be configured to monitor the position of the C-26 control valve and/or whether the cut-out cock is in a cut-in or cut-out position.

The valve 220 includes a knob 226 or handle that is configured to be actuated by an operator of the rail vehicle to set an operational status of the valve 220. For example, the knob 226 may be rotatable relative to a plate 228 over which the knob 226 extends. The knob 226 may include a pointer 230 that is used to indicate a position of the knob 226. The plate 228 may include markings at various positions of the plate 228. The knob 226 may be selectively rotated by an operator such that the pointer 230 is directed to one of the markings on the plate 228. For example, the knob 226 is in a first position when the pointer 230 is directed to a first marking 232 on the plate 228, and the knob 226 is in a second position when the pointer 230 is directed to a second marking 234 on the plate 228. The position of the knob 226 corresponds to the position of the valve 220. The first marking 232 may include an indication of "LEAD," such that when the knob 226 is in the first position, the valve 220 is set to a lead operational status. Likewise, the second marking 234 may include an indication of "TRAIL," such that when the knob 226 is in the second position, the valve 220 is set to a trail operational status. The knob 226 optionally may have more than two positions. In an alternative embodiment, instead of or in addition to a knob 226, the valve 220 may include a switch, a toggle, a button, a lever, or the like, for allowing an operator to set an operational status of the valve 220.

The position sensor 222 is located and/or oriented to detect the position of the knob 226. For example, the position sensor 222 is configured to detect whether the pointer 230 is directed to the first marking 232 indicative of a lead operational status or the second marking 234 indicative of a trail operational status. The position sensor 222 may be mechanically coupled to the valve 220 or located proximate to the valve 220 (as shown in FIG. 2). The position sensor 222 may be a proximity sensor (e.g., to detect relative distance of a defined part of the knob 226 as the knob 226 is actuated), a magnetic pick-up sensor (e.g., to detect a change in a magnetic field caused by actuation of the knob 226), an optical sensor (e.g., a camera coupled to a processor for image analysis of the knob 226), a photodiode, or the like.

Optionally, the position sensor may be an installed limit switch or micro switch (not shown). The limit switch or micro switch may be coupled to the knob 226 of the valve 220 or at least proximate to the knob 226, such that the knob 226 engages the switch as the knob 226 is moved from one position to another position. For example, the knob 226 may engage the switch when the knob 226 is in the second, trail position but not while the knob 226 is in the first, lead position. Alternatively, the knob 226 may engage the switch in both the first and the second positions, but rotation of the knob 226 may cause movement or actuation of the switch such that the position of the switch when the knob 226 is in the first position is different than the position of the switch when the knob 226 is in the second position. Actuation of the switch based on the position of the knob 226 of the valve 220 may open or close a set of interlocks. The switch may send an output signal to a controller of the rail vehicle indicative of the position of the valve 220. The controller interprets the signal to determine the operational status of the rail vehicle.

Referring now back to FIG. 1, the position sensors 114, 214 are communicatively coupled to the respective controllers 22, 32 on the rail vehicles 10, 12. For example, the position sensors 114, 214 produce an output signal (e.g., electrical signal) that is conveyed to the controllers 22, 32 for processing. The output signal of the sensors 114, 214 may be conveyed to the controllers 22, 32 electrically, such as through a wired connection or wirelessly. Alternatively, both output signals from the position sensors 114, 214 may be relayed to a single controller for further processing.

The output signal of each position sensor 114, 214 varies based on the position of the respective mechanically-adjustable valve 112, 212. For example, the output signal of one of the sensors 114, 214 may be a first signal when the mechanically-adjustable valve 112, 212 is in the first position (e.g., corresponding to the lead operational status of the vehicle 10, 12). The output signal of the sensor 114, 214 may be a second, different signal when the mechanically-adjustable valve 112, 212 is in the second position (e.g., corresponding to the trail operational status of the vehicle 10, 12). The first and second output signals may have different characteristics, such as a different frequency, signal-length, amplitude, phase, or the like, in order to distinguish the output signal representative of the first position of each valve 112, 212 from the output signal representative of the second position of each valve 112, 212.

The onboard controllers 22, 32 are configured to receive the output signal generated by each of the respective position sensors 114, 214 and set an operational status of the respective rail vehicles 10, 12 based on the received output signal. For example, each controller 22, 32 may set an operational status of the respective rail vehicle 10, 12 to one of a lead status or a trail status based on whether the output signal of the respective position sensor 114, 214 indicated the respective mechanically-adjusted valve 112, 212 was in the first, lead position or the second, trail position. For example, the signal received from the position sensor 114 in the first rail vehicle 10 may indicate that the valve 112 is in the first, lead position, while the signal received from the position sensor 214 in the second rail vehicle 12 indicates that the valve 212 is in the second, trail position. In response, one or both controllers 22, 32, set a lead operational status for the first vehicle 10 and a trail operational status for the second vehicle 12. In this way, a mechanically-adjusted setting (e.g., lead or trail) of the rail vehicles 10, 12 is electronically communicated to the onboard controllers 22, 32 via the position sensors 114, 214 that monitor the positions of the mechanically-adjustable valves 112, 212 in the respective vehicles 10, 12.

The onboard controllers 22, 32 may be further configured for adjusting engine operations, such as automatic engine shut down and restart (AESS) operations, of the respective rail vehicle 10, 12 based on the operational status of the rail vehicle 10, 12. For example, parameter thresholds or ranges at which the engines 102, 202 of the rail vehicles 10, 12 are automatically shut down or restarted are adjusted based on the operational status. The parameter thresholds may be raised (e.g., parameter ranges narrowed) when the operational status is set to a lead status, for example, and the parameter thresholds may be lowered (e.g., parameter ranges broadened) when the operational status is set to a trail status. Therefore, when one of the vehicles 10, 12 is set to a lead status, the respective engine 102, 202 requires the most restrictive (e.g., highest threshold or narrowest range) parameters prior to allowing the engine to be shut down as compared to other engines of the other vehicles in the rail vehicle system 100, and the engine will restart if the parameters fall outside of the high threshold or narrow range. Due to the restrictive parameters associated with having a lead designation, an engine of a rail vehicle would likely achieve the parameters necessary for shutting down earlier and/or more often if the rail vehicle has a trail designation as opposed to a lead designation. In addition, the engine currently in a shutdown condition would likely be forced to restart earlier and/or more often if the rail vehicle has a lead designation as opposed to a trail designation.

In addition to adjusting AESS operations, the operational status of the rail vehicle 10, 12 in the rail vehicle system 100 may be used to adjust operations of other systems. For example, heating, ventilation, and air-conditioning (HVAC) systems may be adjusted, such as by enabling HVAC systems to condition the air in a cab of a rail vehicle having a lead status and disabling HVAC systems in cabs of trail vehicles. In distributed power operations, the trail rail vehicles may be controlled by a control system and/or an operator in the cab of the lead rail vehicle. Therefore, the cab of the lead vehicle may be occupied by at least one operator while the cabs of the trail vehicles may be unoccupied. The HVAC systems may be temporarily disabled in the trail rail vehicles to conserve energy instead of conditioning a cab that is unoccupied. Other systems that may be adjusted based on the operational status of the rail vehicle 10, 12 may include battery charging systems, trip optimizer systems, consist manager systems, and the like.

Furthermore, once the operational status of the rail vehicle 10, 12 in the rail vehicle system 100 is determined, one or more operating rules for the vehicle 10, 12 may be set or adjusted based on the operational status. For example, when the rail vehicle 10 has a trail operational status, an operating rule may dictate that when the reverser handle and/or throttle handle is moved to a different position the rail vehicle 10 is automatically switched to have a lead operational status. As the rail vehicle 10 is switched from trail to lead status, another rail vehicle (e.g., rail vehicle 12) previously set to lead status may be automatically switched to trail status. In an alternative example, when the rail vehicle 10 has a trail operational status, an operating rule may dictate that if an attempt is made to control the rail vehicle 10 from the local cab, an alarm may sound and/or a message may be displayed to an operator in the cab of the rail vehicle 10 that indicates a wrong configuration. In other embodiments, various other operating rules may be set for the rail vehicles 10, 12 based on the operational statuses of the respective rail vehicles 10, 12 in the consist 8.

In an embodiment, the onboard controllers 22, 32 may monitor the operating parameters in the respective rail vehicles 10, 12, such as when the rail vehicles 10, 12 are idling with engines running and/or parked with engines shut down. The controllers 22, 32, may be configured to verify whether AESS criteria are met, such as by determining whether specific operating parameters exceed a predetermined threshold and/or fall within a defined range. Upon verifying that AESS criteria on one of the vehicles 10, 12 are met (e.g., for a predetermined length of time), a respective onboard controller 22, 32 may enable an AESS routine to shut down the respective engine 102, 202. Shutting down an engine, when available, conserves fuel and reduces noise by reducing the idling time of the rail vehicle engine. The onboard controllers 22, 32 may control respective engines 102, 202 by sending a command signal to various engine control hardware components, such as system inverters, alternators, relays, fuel injectors, fuel pumps, and the like. When the respective engine 102, 202 is shut down, the onboard controller 22, 32 may continue to monitor the operating parameters of the rail vehicles 10, 12. In response to the operating parameters falling below the predetermined threshold or outside of the defined range, the respective engine 102, 202 may be automatically restarted. The engine may be shut down when the operating parameter regains the desired condition. By maintaining the vehicle operating parameters in an operation ready state at all times, rail vehicle efficiency may be improved.

Figure 3:
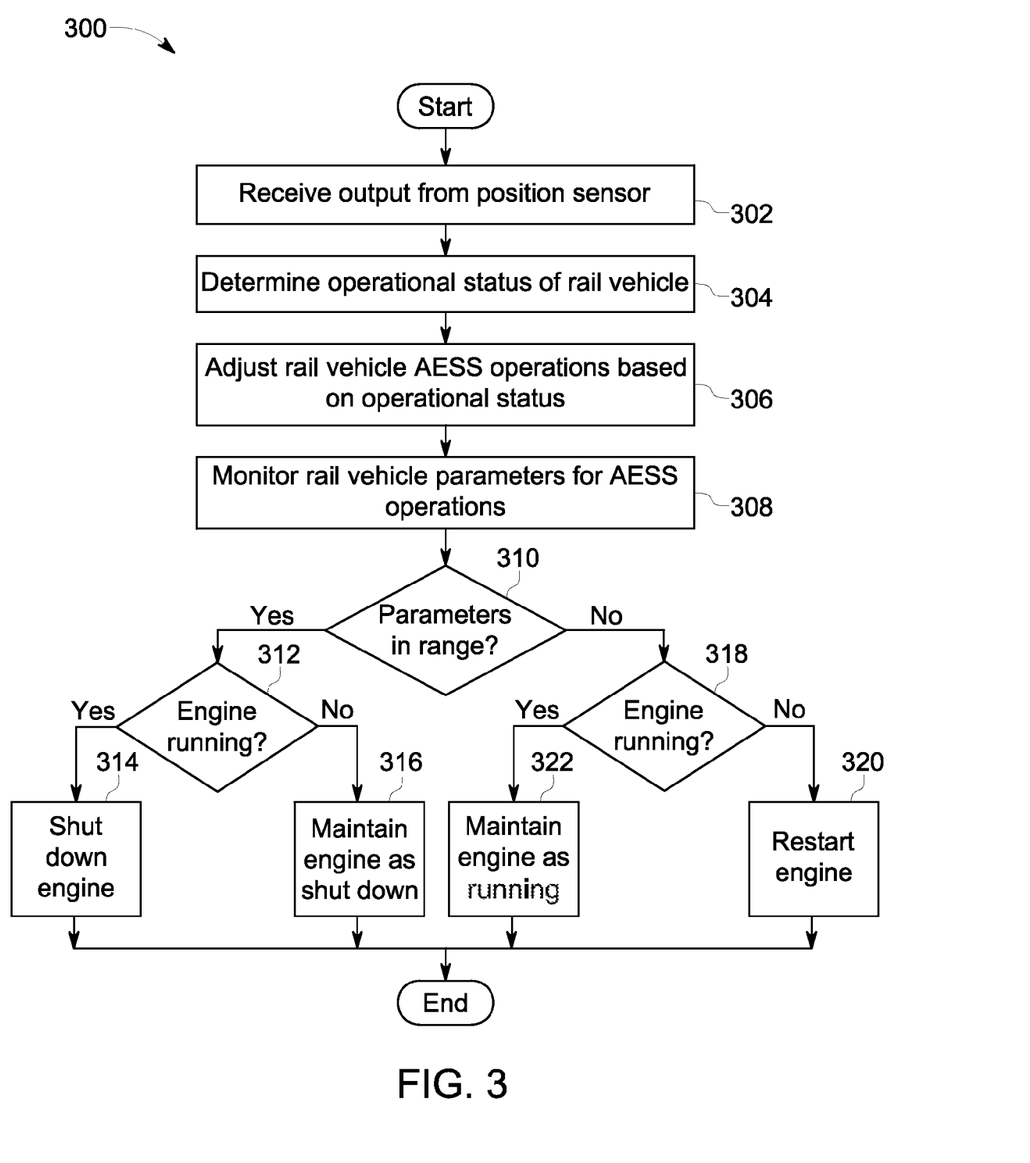
FIG. 3 is a flowchart of an embodiment of a method for setting an operational status of a rail vehicle in a consist and adjusting engine operations of the rail vehicle accordingly.

FIG. 3 is a flowchart of an embodiment for a method 300 for setting an operational status of a rail vehicle (e.g., a locomotive) in a consist, and adjusting engine operations (e.g., AESS operations) of the rail vehicle accordingly. The method 300 may be performed on or in association with at least one of the rail vehicles 10, 12 of the rail vehicle system 100 shown in FIG. 1. For example, the method 300 may be performed automatically by one of the onboard controllers 22, 32 shown in FIG. 1, or another processor of the rail vehicle system 100.

At 302, an output signal from a position sensor is received. The position sensor may monitor a position of a mechanically-adjustable valve, such as the mechanically-adjustable valve 220 shown in FIG. 2. The mechanically-adjustable valve may have a plurality of positions including at least a first position and a second position. The position of the valve may indicate an operational status of the rail vehicle. For example, the first position of the valve may indicate that the rail vehicle is in a lead operational status in a distributed power consist, and the second position may indicate that the rail vehicle is in a trail operational status. The position sensor may monitor the position of the mechanically-adjustable valve and generate an output signal based on, or representative of, the position of the valve. The output signal may be a voltage output or another type of electrical signal. In an embodiment, the output signal when the valve is in the first position differs from the output signal when the valve is in the second position. The signal from the position sensor may be received at a controller, such as at least one of the controllers 22, 32, shown in FIG. 1.

At 304, an operational status of the rail vehicle is determined. For example, the controller may set the operational status of the rail vehicle in the consist based on the output signal received from the position sensor that monitors the position of the mechanically-adjustable valve. The controller may be configured to set a flag corresponding to the operational status of the rail vehicle based on the received output signal. The operational status may be a lead or trail status for distributed power control of the consist, and may include one or more further status designations, such as run or isolate, as described below.

The controller may compare the received output signal to a threshold voltage. If the received signal is greater than the threshold, for example, then the controller may set an operational status of the rail vehicle to a lead status. Alternatively, a received output signal that has a voltage greater than the threshold may indicate that the mechanically-adjustable valve is in a second, trail position, such that the controller sets the operational status of the rail vehicle to a trail status. The controller may refer to a look-up table to associate the received signal with the applicable operational status of the rail vehicle. In alternative embodiments, the operational status may be determined without comparing the received signal to a voltage threshold, such as by analyzing the frequency, the time-length, the phase, and/or data contained in the output signal.

In addition to lead or trail, the controller may be configured to set an operational status of an engine of the rail vehicle as run or isolate. A rail vehicle may have an isolate status when the rail vehicle (e.g., locomotive) is not able to produce power to propel a rail vehicle system because the electrical system, which includes one or more traction motors, is isolated (e.g., operatively uncoupled) from the engine. The engine may be operatively uncoupled from the one or more traction motors by an electrical switch, for example. In contrast, the rail vehicle has a run status when the rail vehicle is able to produce power to propel the rail vehicle system because the engine is operatively coupled to the one or more traction motors of the electrical system. The operational status of run or isolate may be determined based on operator input. For example, the rail vehicle may include an isolation switch and/or an engine control switch which is mechanically-actuated by an operator to select between "run" or "isolate." The switch is electrically connected to the controller, such that the controller receives a signal from the switch indicating whether the rail vehicle has a status of run or isolation. As described above, the controller may receive an output signal from a position sensor that monitors a position of a mechanically-adjustable valve to determine whether the rail vehicle has a status of lead or trail. Using both of these inputs, the controller determines the operational status of the rail vehicle as lead run, lead isolate, trail run, or trail isolate.

For example, the lead run status represents that the operational settings (e.g., brake and/or throttle settings) of the rail vehicle during the trip are used to control one or more other rail vehicles of the rail vehicle system, and that the engine of the rail vehicle is operatively coupled to one or more traction motors to propel the rail vehicle system. The lead isolate status represents that the operational settings of the rail vehicle are used to control one or more other rail vehicles during the trip, and that the rail vehicle is not able to provide power to propel the rail vehicle system because the engine is isolated (e.g., operatively uncoupled) from the one or more traction motors. The trail run status represents that the operational settings of the rail vehicle during the trip are being controlled by another (e.g., a lead) rail vehicle, and that the engine of the rail vehicle is operatively coupled to one or more traction motors to propel the rail vehicle system. The trail isolate status represents that the operational settings of the rail vehicle during the trip are being controlled by another (e.g., a lead) rail vehicle, and that the engine is isolated (e.g., operatively uncoupled) from the traction motors and not able to provide power to propel the rail vehicle system. Therefore, two rail vehicles that both have a trail status may have a different operational status if one vehicle is trail run and the other is trail isolate.

At 306, rail vehicle AESS operations and/or other engine operations are adjusted based on the operational status of the rail vehicle. When the controller sets an operational status for the rail vehicle as a lead status, the AESS operations are adjusted to correspond to a lead rail vehicle. Similarly, when the rail vehicle is set to have a trail status, the AESS operations for the rail vehicle are adjusted to correspond to a trail vehicle. The AESS operations may be adjusted by adjusting parameter thresholds at which the engine of the rail vehicle is automatically restarted and shut down. The parameters may include one or more of air pressure in the main pressure reservoir (e.g., pressure reservoir 108, 208), air pressure in the brake line (e.g., brake system 110, 210), state of charge of the battery (e.g., battery 106, 206), engine temperature, brake application status (e.g., whether the brakes are applied), rail vehicle movement status (e.g., whether the rail vehicle is parked or moving), throttle position, reverser position, and/or the like.

In an embodiment, the controller may raise parameter thresholds and/or narrow a parameter range when the rail vehicle is set to a lead status, and may lower parameter thresholds and/or broaden a parameter range when the rail vehicle is set to a trail status. For example, the controller may set a higher brake pressure threshold in the pressure reservoir for the lead rail vehicle, while setting a lower brake pressure threshold for the trail vehicle. As described below, a rail vehicle may be allowed to shut down when the brake pressure is above the designated threshold, assuming other parameters are also at acceptable levels and/or ranges. For example, the threshold to shut down a lead rail vehicle may be set at a high pressure, such as the maximum pressure in the main reservoir (e.g., up to or exceeding 140 psi). In contrast, the threshold necessary to shut down a trail vehicle may be set much lower, such as at 80 psi, for example. Therefore, under these parameter thresholds, a rail vehicle with a brake pressure threshold of 100 psi would surpass the threshold necessary for a trail vehicle to be shut down, but would not surpass the threshold associated with shutting down a lead vehicle.

In addition to determining conditions for shutting down an engine of a rail vehicle, parameter thresholds and/or ranges may be used to determine conditions for automatically restarting an engine that is currently shut down. For example, a lead vehicle that is shut down may be automatically restarted when the brake pressure falls below a threshold of 105 psi, while a trail vehicle would not be automatically restarted until the brake pressure falls below a threshold of 60 psi. The threshold and/or range for shutting down an engine of a rail vehicle may not be the same threshold and/or range for restarting the engine of the same rail vehicle, regardless of operational status.

Furthermore, adjusting AESS operations may include enabling and/or disabling a set of features based on the set operational status of the rail vehicle. For example, some control features (e.g., throttle settings) may be enabled on the lead rail vehicle while the same control features may be disabled on the remote rail vehicle. The thresholds and/or features corresponding to the different operational status settings of the rail vehicle may be stored in a look-up table within a computer-readable storage device and accessed by the controller upon determination of the operational status.

In addition to adjusting AESS operations based on lead versus trail, the AESS operations may be further adjusted based on whether the status of the rail vehicle is "lead run," "lead isolate," "trail run," or "trail isolate." The AESS operations may be adjusted such that the conditions necessary to allow an engine to be shut down or force the engine to be restarted are most restrictive for a rail vehicle that has a lead run operational status, and the conditions are least restrictive, or most relaxed, for a vehicle designated as trail isolate. The parameter thresholds and other conditions for rail vehicles designated as lead isolate and trail run may be adjusted to be more restrictive than for the trail isolate status and less restrictive than for the lead run status.

For a rail vehicle designated as having a lead run operational status, in order for an engine of the rail vehicle to be allowed to shut down, a series of restrictive conditions must be satisfied. For example, the rail vehicle must be parked, the brakes applied, the throttle in idle, the reverser handle in center, and the main reservoir pressure must be greater than or at a high threshold (e.g., 135 psi or within a narrow range of the maximum pressure in the main reservoir). In order to shut down an engine of a rail vehicle having a status of lead isolate or trail run, the conditions need not be so restrictive. For example, although the rail vehicle may be required to be parked, the threshold for the main reservoir pressure may be lowered. For example, the engine may be allowed to shut down as long as the pressure in the main reservoir exceeds a pressure of 80 psi. By comparison, the AESS operations for a rail vehicle designated as trail isolate may allow an engine of the rail vehicle to shut down even when the rail vehicle is moving. Optionally, the engine of the trail isolate rail vehicle may be shut down regardless of the pressure in the main reservoir or as long as the pressure is above a reduced threshold that is below the thresholds set for the other operational statuses (e.g., lead run, lead isolate, and trail run). In addition, brake application status, throttle position, and/or reverser position optionally may also be removed as triggers or conditions before shutting down an engine of the trail isolate rail vehicle.

At 308, rail vehicle parameters are monitored for AESS operations. Monitoring the rail vehicle parameters may include the controller receiving data collected by various sensors on or associated with the rail vehicle, such as engine temperature sensors, throttle position sensors, reverser position sensors, brake application sensors, velocity sensors, pressure sensors in the main reservoir and/or the brake line of the brake system, battery voltage sensors, and/or the like. The controller analyzes the received data to determine current parameters of the rail vehicle. At least some of the parameters of the rail vehicle may be used for determining AESS operations, including main reservoir pressure, throttle position, whether the brakes are applied, whether the rail vehicle is moving, and the like. In an embodiment, the rail vehicle parameters are monitored even while an engine of the rail vehicle is shut down to determine when the engine must be restarted.

At 310, a determination is made whether the rail vehicle parameters are in range according to the adjusted AESS operations. A parameter may be in range when the parameter is at a desired condition, such as within a desired range of values or above (or below) a desired threshold. The desired condition indicates that the parameter is in a condition that would not prohibit an engine of the rail vehicle from being shut down. The range and/or threshold may be adjusted based on the operational status of the rail vehicle, as described above. Optionally, the controller may monitor one parameter or multiple parameters concurrently to determine if the parameters are within corresponding ranges. For example, the controller on a rail vehicle designated with a lead run status may monitor and determine whether the throttle is in an idle position, whether the reverser handle is in a center position, whether the rail vehicle is parked, whether the pressure in the main reservoir is above a threshold value, and the like, to determine if the AESS criteria are met for the engine of the rail vehicle to be safe for shutting down.

In an embodiment, all of the parameters used as triggers for a given operational status must be satisfied in order for the determination at step 310 to be answered in the affirmative. Therefore, even if the pressure of the main reservoir is below the threshold value for a rail vehicle with a lead run status, step 310 may be answered affirmatively for a rail vehicle with a trail run status as long as the pressure is above the lowered threshold value adjusted for the trail run operational status and the other parameters are satisfied (e.g., the rail vehicle is parked, etc.). As such, the determination at step 310 may depend on both the specific parameters used as triggers for AESS operations and whether all of those specific parameters are within the set ranges. Upon verifying whether the parameters are within a prescribed range of desired values, at 312 and 318, it is determined whether the rail vehicle engine is currently running. The controller may receive verification from a sensor whether or not the engine is currently running.

At 314, the one or more operating parameters are within the desired range, and the engine is in a current running condition. As a result, the AESS requirements necessary before the engine may be shut down are satisfied. In response, the engine of the rail vehicle is controlled to be shut down. However, if the operating parameters are in range but the engine is already in a shutdown condition, then, at 316, the engine of the rail vehicle is maintained as shut down. Shutting down the engine of the rail vehicle when the AESS conditions, specific to the operational status of the rail vehicle, are satisfied improves efficient operation of the rail vehicle system by conserving fuel and reducing noise. As shown in step 316, the method 300 may be performed even when the engine is currently shut down, because, as described below, when one or more of the parameters deviate from the predefined range, the engine may be controlled to be automatically restarted.

At 320, one or more of the operating parameters are not in the defined range or do not exceed the defined threshold, and the engine is not currently running such that the engine is in a current shutdown condition. Although the engine is shut down, the AESS conditions necessary to allow the engine to be shut down are no longer satisfied, so the engine is automatically controlled to restart. The engine may be restarted in order to generate power to propel the rail vehicle and/or to provide the power to allow the parameters to be brought back within the define range. For example, the engine may be restarted to provide power to an air compressor to supply compressed air to the main pressure reservoir to raise the pressure in the reservoir into a desired range or above a defined threshold. In another example, if the battery charge has dissipated such that the battery state of charge has dropped out of a defined range, then the engine may be run to allow the electrical power generated by the engine to recharge the battery and regain a state of charge of the battery within the defined range. Optionally, the engine may be automatically started when any of the monitored operating parameters fall outside of the respective desired range or conditions.

At 322, however, the engine is already running (e.g., in a running condition) but one or more of the parameters are not in the corresponding range. In response, the controller maintains the engine in the running condition. This situation may occur, for example, as the rail vehicle is moving along a trip and the engine generates power to propel the rail vehicle. If the rail vehicle has an operational status of lead run or perhaps lead isolate or trail run, the AESS operations may prohibit the engine of the rail vehicle to be shut down while the rail vehicle is moving. Therefore, at least the parameter of the rail vehicle being parked is not satisfied at step 310, so the engine is maintained as running.

It will be further appreciated that the range and/or threshold of a rail vehicle operating parameter at which the engine is automatically restarted according to AESS operations may differ from the threshold at which the engine is automatically shut down. In one example, the engine may be automatically started when the battery state of charge has dropped below 30%. In contrast, the engine may be run until a battery state of charge of 50% is reached, following which the engine may be automatically shut down.

Figure 4:
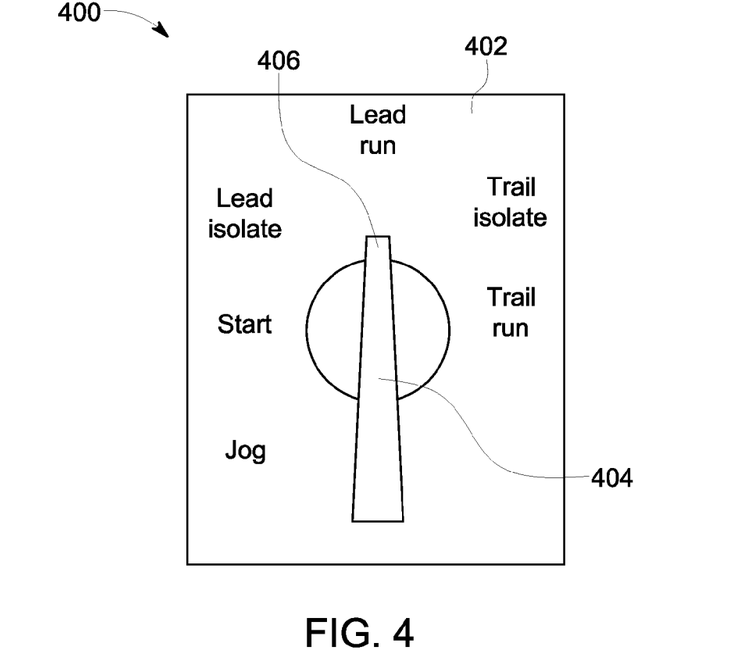
FIG. 4 illustrates a mechanically-adjustable engine control switch according to an alternative embodiment for setting an operational status of a rail vehicle in a consist.
Figure 5:
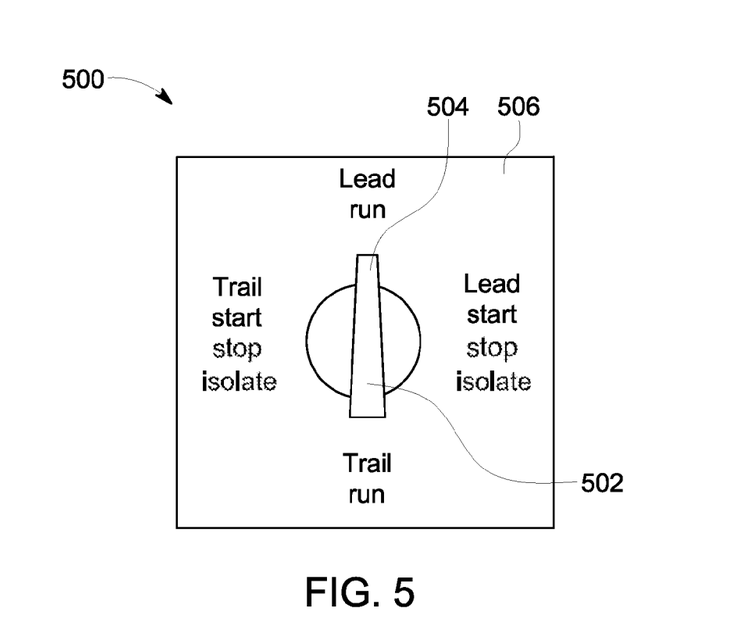
FIG. 5 illustrates another mechanically-adjustable engine control switch according to an alternative embodiment for setting an operational status of a rail vehicle in a consist.

FIGS. 4 and 5 illustrate alternative embodiments of a mechanically-adjustable engine control switch (e.g., engine control switch 400 shown in FIG. 4 and engine control switch 500 shown in FIG. 5) for setting an operational status of a rail vehicle in a consist. In an embodiment, one of the mechanically-adjustable engine control switches 400, 500 may be provided to allow an operator to mechanically set the operational status of the rail vehicle in a rail vehicle consist. It should be recognized that the engine control switches 400, 500 are two alternative embodiments of a mechanically-adjustable control switch, such that a rail vehicle may include the engine control switch 400 shown in FIG. 4 or the engine control switch 500 shown in FIG. 5. Optionally, though, a rail vehicle may include both engine control switches 400, 500.

The engine control switch 400 shown in FIG. 4 includes six positions spaced apart on a panel 402—"jog," "start," "lead isolate," "lead run," "trail isolate," and "trail run." The engine control switch 400 also includes a knob 404 that has a pointer 406. The knob 404 is configured to be rotated by an operator such that the pointer 406 is directed to (e.g., is the most proximate to) one of the six marked positions. Therefore, the operator may set an operational status of the rail vehicle by rotating the knob 404 to a selected one of the six positions, such as the "lead run" position to set the status of the rail vehicle as a lead run status, for example.

Similarly, the engine control switch 500 shown in FIG. 5 includes a rotatable knob 502 with a pointer 504. The switch 500 also includes a panel 506 that has four defined positions—"trail start stop isolate," lead run," "lead start stop isolate," and "trail run"—such that the knob 502 may be mechanically rotated by an operator for the pointer 504 to be directed to one of the four marked positions. As an alternative to a rotatable knob 404, 502, either of the engine control switches 400, 500 may have a toggle, rocker, rotary, push-button, or the like, in order to select one of the positions on the respective switch 400, 500. In either of the engine control switches 400, 500, the operator is able to set the respective knob 404, 502 to select a lead run status, a lead isolate status, a trail run status, or a trail isolate status.

The engine control switch 400, 500 may be communicatively coupled to a controller or control system of a rail vehicle in a consist. For example, the switch 400, 500 may be electrically connected via a wired connection or a wireless connection to the controller. Based on the position of the switch 400, 500 (e.g., the position of the knob 404 relative to the panel 402 or the position of the knob 502 relative to the panel 506), the engine control switch may send a different electrical signal to the controller. The electrical signal may directly indicate to the controller the operational status of the respective rail vehicle, including whether the rail vehicle is lead or trail and whether an engine of the rail vehicle is run or isolate. The controller may set the operational status as lead run, lead isolate, trail run, or trail isolate based on the received electrical signal. The controller may then adjust engine operations, such as AESS operations, based on the operational status, as described further herein. Using the engine control switch 400 or engine control switch 500, a mechanically-selected operational status by an operator may be communicated directly to the controller, without affecting or interfering with the brake system or other systems of the rail vehicle. In addition, either one of the engine control switches 400, 500 may be a relatively simple retrofit on an existing base of an old engine control switch or isolation switch.

In an alternative embodiment, the air brake system of the rail vehicles may include electrically-controlled pneumatic valves instead of mechanically-controlled pneumatic valves, such as the mechanically-adjustable valve 220 shown in FIG. 2. The electrically-controlled valves may be communicatively coupled to a mechanically-operable control switch, such as the engine control switch 400 shown in FIG. 4 or the engine control switch 500 shown in FIG. 5. As such, when an operator mechanically selects an operational status of the rail vehicle (e.g., lead run, lead isolate, trail run, or trail isolate) using the control switch, the control switch sends a signal to the electric valves in the brake system in addition to, or instead of, sending a signal to the controller to allow the controller to adjust engine operations based on the operational status. The signal to the electrically-controlled valves may be used to automatically move the pneumatic valves to configure the air brakes based on the operational status of the rail vehicle. Therefore, the engine operations (e.g., AESS operations) and the air brakes of the rail vehicle may both be adjusted automatically once the operator takes the single step of selecting an operational status using the control switch.

In another alternative embodiment, a rail vehicle may include a dedicated lead-trail switch (not shown) that allows an operator of the rail vehicle to mechanically select the operational status of the rail vehicle as lead or trail. The dedicated lead-trail switch may be used in combination with a run-isolation switch, such as a traditional engine control switch or isolation switch, that allows the operator to mechanically select the operational status of an engine of the rail vehicle as run or isolate. For example, to set the operational status of the rail vehicle to a lead run status, an operator actuates the dedicated lead-trail switch to select "lead" and the run-isolate switch to select "run." The operator may actuate the dedicated lead-trail switch by engaging a toggle, knob, rocker, pushbutton, or the like. In an alternative embodiment, the dedicated lead-trail switch may be a soft switch that is part of a user interface on a touchscreen. The soft switch may operate according to software and may be controlled by a microprocessor.

The dedicated lead-trail switch and the run-isolate switch may both be communicatively coupled (e.g., electrically connected) to a controller associated with the rail vehicle. The controller receives an electrical signal indicative of a lead status or a trail status from the dedicated lead-trail switch. The controller receives an electrical signal indicative of a run status or an isolate status from the run-isolate switch. After receiving the signals from both the switches, the controller determines the operational status of the rail vehicle as lead run, lead isolate, trail run, or trail isolate, and adjusts the engine operations (e.g., AESS operations) of the rail vehicle according to the operational status.

Optionally, any of the sensors or switches described herein may be configured to communicate with rail vehicles other than the rail vehicle on which the sensors or switches are disposed. For example, a switch located on a first rail vehicle in a consist may be wired to a second rail vehicle in the consist. Alternatively, the sensors and/or switches may transmit and/or receive messages/signals wirelessly between rail vehicles. The controller that adjusts the engine operations of the rail vehicles in the consist may be located on the second rail vehicle. Therefore, the switch conveys a signal from the first rail vehicle to the second rail vehicle for the controller to adjust the engine operations of the first vehicle.

In an embodiment, a control system for a vehicle system includes a mechanically-adjustable valve, a position sensor, and a controller. The mechanically-adjustable valve is configured to be disposed onboard a rail vehicle that is coupled to at least one other rail vehicle in a consist to travel together along a route for a trip. The mechanically-adjustable valve has a plurality of positions. The position sensor is configured to be disposed in the rail vehicle to monitor a current position of the mechanically-adjustable valve. The position sensor is configured to generate an output signal that represents the current position of the mechanically-adjustable valve. The controller is configured to be communicatively coupled to the position sensor and to receive the output signal of the position sensor. The controller is also configured to set an operational status of the rail vehicle in the consist based on the output signal and to adjust automatic engine shutdown and restart operations of the rail vehicle based on the operational status of the rail vehicle.

In an aspect, the controller is configured to set the operational status of the rail vehicle in the consist to one of a lead status or a trail status based on the output of the position sensor. The lead status represents that operational settings including at least one of throttle or brake settings of the rail vehicle during the trip are used to control the at least one other rail vehicle in the consist according to a distributed power arrangement. The trail status represents that the operational settings of the rail vehicle are controlled by the at least one other rail vehicle in the consist. For example, when the operational status of the rail vehicle is set to the lead status, the rail vehicle is configured to control the at least one other rail vehicle in the consist during some or all of the trip (that is, until the operational status is changed), according to the distributed power arrangement, based on the operational settings of the rail vehicle (e.g., the throttle and/or brake settings of the rail vehicle). Thus, it may be the case that the when the rail vehicle is controlled to a particular throttle level, the at least one other rail vehicle is controlled to the same throttle level. As another example, when the operational status of the rail vehicle is set to the trail status, the rail vehicle is configured for its operational settings (e.g., throttle and/or brake settings) to be controlled by the at least one other rail vehicle in the consist.

In an aspect, the controller is configured to set the operational status to the lead status when the output signal of the position sensor indicates that the current position of the mechanically-adjustable valve is a first position. The controller is configured to set the operational status to the trail status when the output signal of the position sensor indicates that the current position of the mechanically-adjustable valve is a different, second position.

In an aspect, the controller is configured to adjust the automatic engine shutdown and restart operations of the rail vehicle by at least one of raising a threshold or narrowing a range associated with one or more parameters of the rail vehicle when the operational status is set to the lead status, and at least one of lowering the threshold or broadening the range associated with the one or more parameters when the operational status is set to the trail status.

In an aspect, the controller is configured to at least one of shut down an engine of the rail vehicle from a current running condition or maintain the engine in a current shutdown condition when a value of the one or more parameters at least one of exceeds the corresponding threshold or falls within the corresponding range.

In an aspect, the controller is configured to at least one of automatically restart an engine of the rail vehicle from a current shutdown condition or maintain the engine in a current running condition when a value of the one or more parameters at least one of falls below the corresponding threshold or falls outside the corresponding range.

In an aspect, the control system further includes a mechanically-adjustable engine control switch configured to be disposed onboard the rail vehicle and communicatively coupled to the controller and an engine of the rail vehicle. The engine control switch is selectively positionable between a first switch position representative of a run operational status of the engine and a second switch position representative of an isolate operational status of the engine. The run operational status indicates that the engine is operatively coupled to a traction motor to provide power to propel the rail vehicle. The isolate operational status indicates that the engine is operatively uncoupled from the traction motor and does not provide power to propel the rail vehicle. The engine control switch is configured to provide an electrical signal to the controller based on the engine having the run operational status or the isolate operational status.

In an aspect, based on the received output signal of the position sensor and the electrical signal of the engine control switch, the controller is configured to set the operational status of the rail vehicle to one of a lead run status, a lead isolate status, a trail run status, or a trail isolate status.

In an aspect, the position sensor is at least one of a proximity sensor, a magnetic pick-up sensor, an optical sensor, a limit switch, or a micro switch.

In an aspect, the mechanically-adjustable valve is at least one of a MU-2-A valve, a C-26 control valve, or a cut-out cock.

In an embodiment, a method (e.g., for setting an operational status of a rail vehicle in a consist and adjusting engine operations of the rail vehicle) includes receiving an output signal from a position sensor configured to be disposed onboard a rail vehicle that is coupled to at least one other rail vehicle in a consist to travel together along a route for a trip. The position sensor is configured to monitor a current position of a mechanically-adjustable valve configured to be disposed onboard the rail vehicle. The mechanically-adjustable valve has a plurality of positions. The output signal represents the current position of the mechanically-adjustable valve. The method also includes setting, by one or more processors, an operational status of the rail vehicle in the consist to one of a lead status or a trail status automatically based on the output signal received from the position sensor. The lead status represents that operational settings including at least one of throttle or brake settings of the rail vehicle during the trip are used to control the at least one other rail vehicle in the consist according to a distributed power arrangement. The trail status represents that the operational settings of the rail vehicle are controlled by the at least one other rail vehicle in the consist. The method further includes adjusting, by the one or more processors, automatic engine shutdown and restart operations of the rail vehicle based on the operational status.

In an aspect, the operational status of the rail vehicle is set to the lead status when the output signal from the position sensor indicates that the current position of the mechanically-adjustable valve is a first position. The operational status of the rail vehicle is set to the trail status when the output signal from the position sensor indicates that the current position of the mechanically-adjustable valve is a different, second position.

In an aspect, adjusting the automatic engine shutdown and restart operations of the rail vehicle includes at least one of raising a threshold or narrowing a range associated with one or more parameters of the rail vehicle when the operational status is set to the lead status, and at least one of lowering the threshold or broadening the range associated with the one or more parameters when the operational status is set to the trail status.

In an aspect, the method further includes monitoring the one or more parameters of the rail vehicle to determine a value of the one or more parameters.

In an aspect, the method further includes at least one of shutting down an engine of the rail vehicle in a current running condition or maintaining the engine in a current shutdown condition when the value of the one or more parameters at least one of exceeds the corresponding threshold or falls within the corresponding range.

In an aspect, the method further includes at least one of automatically restarting an engine of the rail vehicle in a current shutdown condition or maintaining the engine in a current running condition when the value of the one or more parameters at least one of falls below the corresponding threshold or falls outside the corresponding range.

In an aspect, the method further includes receiving an electrical signal from a mechanically-adjustable engine control switch configured to be disposed onboard the rail vehicle. The engine control switch is selectively positionable between a first switch position and a second switch position. The first switch position represents a run operational status of an engine of the rail vehicle and the second switch position represents an isolate operational status of the engine. The run operational status indicates that the engine is operatively coupled to a traction motor to provide power to propel the rail vehicle along the route. The isolate operational status indicates that the engine is operatively uncoupled from the traction motor and does not provide power to propel the rail vehicle. The electrical signal received from the engine control switch represents that the engine control switch is in the first position or the second position.

In an aspect, the operational status of the rail vehicle is set to one of a lead run status, a lead isolate status, a trail run status, or a trail isolate status based on the output signal from the position sensor and the electrical signal from the engine control switch.

In an embodiment, a control system for a vehicle system includes a mechanically-adjustable first control switch configured to be disposed onboard a rail vehicle that is coupled to at least one other rail vehicle in a consist to travel together along a route for a trip. The first control switch has a plurality of positions and is configured to generate a first signal that represents a current position of the first control switch among the plurality of positions. The controller is configured to be communicatively coupled to the first control switch to receive the first signal generated by the first control switch. The controller is configured to set an operational status of the rail vehicle in the consist based on the signal and to adjust automatic engine shutdown and restart operations of the rail vehicle based on the operational status of the rail vehicle. The operational status is at least one of lead run, lead isolate, trail run, or trail isolate.

In an aspect, the first signal from the first control switch represents a lead status or a trail status of the rail vehicle. The lead status represents that operational settings including at least one of throttle or brake settings of the rail vehicle are used to control the at least one other rail vehicle in the consist during the trip according to a distributed power arrangement. The trail status represents that the operational settings of the rail vehicle are controlled during the trip by the at least one other rail vehicle in the consist.

In an aspect, the control system further includes a mechanically-adjustable second control switch configured to be disposed onboard the rail vehicle. The second control switch has a plurality of positions. The controller is configured to receive a second signal generated by the second control switch that represents a run status or an isolate status of an engine of the rail vehicle. The run status indicates that the engine is operatively coupled to a traction motor to provide power to propel the rail vehicle. The isolate status indicates that the engine is operatively uncoupled from the traction motor and does not provide power to propel the rail vehicle. The controller is configured to set the operational status of the rail vehicle as at least one of lead run, lead isolate, trail run, or trail isolate based on the first and second signals.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are example embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "including," "comprising," or "having" (and various forms thereof) an element or a plurality of elements having a particular property may include additional such elements not having that property.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

The invention claimed is:

1. A system comprising:
a position sensor configured to be disposed in a first vehicle of a vehicle consist having the first vehicle and at least a second vehicle, the position sensor configured to monitor a position of a mechanically-adjustable valve that is onboard the first vehicle and that switches between plural different positions, the position sensor configured to generate a first output signal that represents the position of the mechanically-adjustable valve; and
a controller configured to be communicatively coupled to the position sensor and to receive the first output signal of the position sensor, the controller further configured to be communicatively coupled to a mechanically-adjustable engine control switch and to receive a second output signal from the engine control switch, the controller also configured to set an operational status of the first vehicle in the vehicle consist to lead run, lead isolate, trail run, or trail isolate based on the first and second output signals and to adjust automatic engine shutdown and restart operations of the first vehicle based on the operational status of the first vehicle that is set by the controller.

2. The system of claim 1, wherein, during operation of the first vehicle in the lead run status, operational settings, including at least one of throttle or brake settings, of the second vehicle are controlled by the first vehicle according to a distributed power arrangement, and an engine of the first vehicle is operatively coupled to one or more traction motors of the first vehicle to propel the vehicle consist,
wherein, during operation of the first vehicle in the lead isolate status, the operational settings of the second vehicle are controlled by the first vehicle according to the distributed power arrangement, and the engine of the first vehicle is operatively uncoupled from the one or more traction motors such that the first vehicle is not able to propel the vehicle consist,
wherein, during operation of the first vehicle in the trail run status, the operational settings of the first vehicle are controlled by the second vehicle according to the distributed power arrangement, and the engine of the first vehicle is operatively coupled to the one or more fraction motors of the first vehicle to propel the vehicle consist, and
wherein, during operation of the first vehicle in the trail isolate status, the operational settings of the first vehicle are controlled by the second vehicle according to the distributed power arrangement, and the engine of the first vehicle is operatively uncoupled from the one or more traction motors such that the first vehicle is not able to propel the vehicle consist.

3. The system of claim 1, wherein the controller is configured to set the operational status of the first vehicle to lead run or lead isolate in response to the first output signal of the position sensor indicating that the mechanically-adjustable valve is in a first position of the plural different positions, and the controller is configured to set the operational status to trail run or trail isolate in response to the first output signal of the position sensor indicating that the position of the mechanically-adjustable valve is in a second position of the plural different positions.

4. The system of claim 1, wherein, during operation of the first vehicle in the lead run status, the controller is configured to adjust the automatic engine shutdown and restart operations of the first vehicle by setting at least one of a high threshold or a narrow range associated with one or more parameters of the first vehicle, during operation of the first vehicle in the lead isolate status or the trail run status, the controller is configured to set at least one of an intermediate threshold or a medium range associated with the one or more parameters, and, during operation of the first vehicle in the trail isolate status, the controller is configured to set at least one of a low threshold or a broad range associated with the one or more parameters.

5. The system of claim 4, wherein the controller is configured to at least one of shut down an engine of the first vehicle or maintain the engine in a shutdown condition in response to a value of the one or more parameters at least one of exceeding the corresponding threshold or falling within the corresponding range.

6. The system of claim 4, wherein the controller is configured to at least one of restart an engine of the first vehicle or maintain the engine in a running condition in response to a value of the one or more parameters at least one of falling below the corresponding threshold or falling outside the corresponding range.

7. The system of claim 4, wherein one of the parameters of the first vehicle is a brake pressure of a brake system of the first vehicle, the controller being configured to adjust the automatic engine shutdown and restart operations of the first vehicle by setting a high brake pressure threshold in response to the operational status of the first vehicle being lead run, setting an intermediate brake pressure threshold in response to the operational status being lead isolate or trail run, and setting a low brake pressure threshold in response to the operational status being trail isolate.

8. The system of claim 1, further comprising the mechanically-adjustable engine control switch, the engine control switch configured to be disposed onboard the first vehicle and communicatively coupled to both the controller and an engine of the first vehicle, the engine control switch selectively positionable between a first switch position representative of a run operational status of the engine and a second switch position representative of an isolate operational status of the engine, the second output signal provided by the engine control switch to the controller indicating that the engine control switch is in the first switch position or the second switch position.

9. The system of claim 1, wherein, during operation of the first vehicle in the lead run status, the controller is configured to adjust the automatic engine shutdown and restart operations to allow an engine of the first vehicle to be shut down from a running condition or to maintain the engine in a shutdown condition in response to the first vehicle being stationary, a brake system of the first vehicle being applied, a throttle of the first vehicle being in an idle position, and a brake pressure of the brake system being at least equal to or greater than a high brake pressure threshold.

10. The system of claim 1, wherein, during operation of the first vehicle in the lead isolate status or the trail run status, the controller is configured to adjust the automatic engine shutdown and restart operations to allow an engine of the first vehicle to be shut down from a running condition or to maintain the engine in a shutdown condition in response to the first vehicle being stationary and a brake pressure of a brake system of the first vehicle being at least equal to or greater than a designated intermediate brake pressure threshold.

11. The system of claim 1, wherein, during operation of the first vehicle in the trail isolate status, the controller is configured to adjust the automatic engine shutdown and restart operations to allow an engine of the first vehicle to be shut down from a running condition or to maintain the engine in a shutdown condition in response to a brake pressure of a brake system of the first vehicle being at least equal to or greater than a designated low brake pressure threshold.

12. A method, comprising:
receiving a first output signal from a position sensor configured to be disposed onboard a first vehicle of a vehicle consist having the first vehicle and at least a second vehicle, the position sensor configured to monitor a position of a mechanically-adjustable valve that is onboard the first vehicle and that switches between plural different positions, the first output signal representative of the position of the mechanically-adjustable valve, the position of the mechanically-adjustable valve indicating that the first vehicle has a lead designation or a trail designation according to a distributed power arrangement;
receiving a second output signal from a mechanically-adjustable engine control switch disposed onboard the first vehicle, the second output signal representative of a position of the engine control switch among a plurality of different positions, the position of the engine control switch indicating that an engine of the first vehicle has a run designation or an isolate designation;
setting, by one or more processors, an operational status of the first vehicle to lead run, lead isolate, trail run, or trail isolate automatically based on the first and second output signals; and
adjusting, by the one or more processors, automatic engine shutdown and restart operations of the first vehicle based on the operational status of the first vehicle that is set by the one or more processors.

13. The method of claim 12, wherein, during operation of the first vehicle in the lead run status, adjusting the automatic engine shutdown and restart operations of the first vehicle includes setting at least one of a high threshold or a narrow range associated with one or more parameters of the first vehicle, during operation of the first vehicle in the lead isolate status or the trail run status, adjusting the automatic engine shutdown and restart operations includes setting at least one of an intermediate threshold or a medium range associated with the one or more parameters of the first vehicle, and, during operation of the first vehicle in the trail isolate status, adjusting the automatic engine shutdown and restart operations includes setting at least one of a low threshold or a broad range associated with the one or more parameters.

14. The method of claim 13, further comprising monitoring the one or more parameters of the first vehicle to determine a value of the one or more parameters.

15. The method of claim 14, further comprising at least one of shutting down an engine of the first vehicle or maintaining the engine in a shutdown condition when the value of the one or more parameters at least one of exceeds the corresponding threshold or falls within the corresponding range.

16. The method of claim 14, further comprising at least one of automatically restarting an engine of the first vehicle or maintaining the engine in a running condition when the value of the one or more parameters at least one of falls below the corresponding threshold or falls outside the corresponding range.

17. The method of claim 12, wherein, during operation of the first vehicle in the lead run status, operational settings, including at least one of throttle or brake settings, of the second vehicle in the vehicle consist are controller by the first vehicle according to a distributed power arrangement, and an engine of the first vehicle is operatively coupled to one or more traction motors of the first vehicle to propel the vehicle consist,
wherein, during operation of the first vehicle in the lead isolate status, the operational settings of the second vehicle are controlled by the first vehicle according to the distributed power arrangement, and the engine of the first vehicle is operatively uncoupled from the one or more traction motors such that the first vehicle is not able to propel the vehicle consist,
wherein, during operation of the first vehicle in the trail status, the operational settings of the first vehicle are controlled by the second vehicle in the vehicle consist according to the distributed power arrangement, and the engine of the first vehicle is operatively coupled to the one or more traction motors of the first vehicle to propel the vehicle consist, and wherein, during operation of the first vehicle in the trail isolate status, the operational settings of the first vehicle are controlled by the second vehicle according to the distributed power arrangement, and the engine of the first vehicle is operatively uncoupled from the one or more traction motors such that the first vehicle is not able to propel the vehicle consist.

18. A system comprising:

a mechanically-adjustable control switch configured to be disposed onboard a first vehicle of a vehicle consist having the first vehicle and at least a second vehicle, the control switch being switchable between at least four different positions and configured to generate an output signal that represents a position of the control switch among the different positions; and a controller configured to be communicatively coupled to the control switch to receive the output signal generated by the control switch, the controller configured to set an operational status of the first vehicle in the vehicle consist to lead run, lead isolate, trail run, or trail isolate based on the output signal, the controller further configured to adjust automatic engine shutdown and restart operations of the first vehicle based on the operational status of the first vehicle that is set by the controller.

19. The system of claim 18, wherein, during operation of the first vehicle in the lead run status, operational settings, including at least one of throttle or brake settings, of the second vehicle in the vehicle consist are controlled by the first vehicle according to a distributed power arrangement, and an engine of the first vehicle is operatively coupled to one or more traction motors of the first vehicle to propel the vehicle consist, wherein, during operation of the first vehicle in the lead isolate status, the operational settings of the second vehicle are controlled by the first vehicle according to the distributed power arrangement, and the engine of the first vehicle is operatively uncoupled from the one or more traction motors such that the first vehicle is not able to propel the vehicle consist, wherein, during operation of the first vehicle in the trail run status, the operational settings of the first vehicle are controlled by the second vehicle in the vehicle consist according to the distributed power arrangement, and the engine of the first vehicle is operatively coupled to the one or more traction motors of the first vehicle to propel the vehicle consist, and wherein, during operation of the first vehicle in the trail isolate status, the operational settings of the first vehicle are controlled by the second vehicle according to the distributed power arrangement, and the engine of the first vehicle is operatively uncoupled from the one or more traction motors such that the first vehicle is not able to propel the vehicle consist.

20. The system of claim 18, wherein, during operation of the first vehicle in the lead run status, the controller is configured to adjust the automatic engine shutdown and restart operations of the first vehicle by setting at least one of a high threshold or a narrow range associated with one or more parameters of the first vehicle, during operation of the first vehicle in the lead isolate status or the trail run status, the controller is configured to set at least one of an intermediate threshold or a medium range associated with the one or more parameters, and, during operation of the first vehicle in the trail isolate status, the controller is configured to set at least one of a low threshold or a broad range associated with the one or more parameters.

21. The system of claim 18, wherein the controller is configured to adjust the automatic engine shutdown and restart operations of the first vehicle by setting a high brake pressure threshold in response to the operational status of the first vehicle being lead run, setting an intermediate brake pressure threshold in response to the operational status being lead isolate or trail run, and setting a low brake pressure threshold in response to the operational status being trail isolate, and wherein the controller is configured to at least one of shut down an engine of the first vehicle or maintain the engine in a shutdown condition in response to a brake pressure of a brake system of the first vehicle exceeding the corresponding brake pressure threshold associated with the operational status.

* * * * *